Sept. 7, 1954  M. E. DROZ ET AL  2,688,442
VECTOR CALCULATOR

Filed Feb. 20, 1946

*INVENTOR.*
MARCEL E. DROZ
WILFRED ROTH
BY

*ATTORNEY*

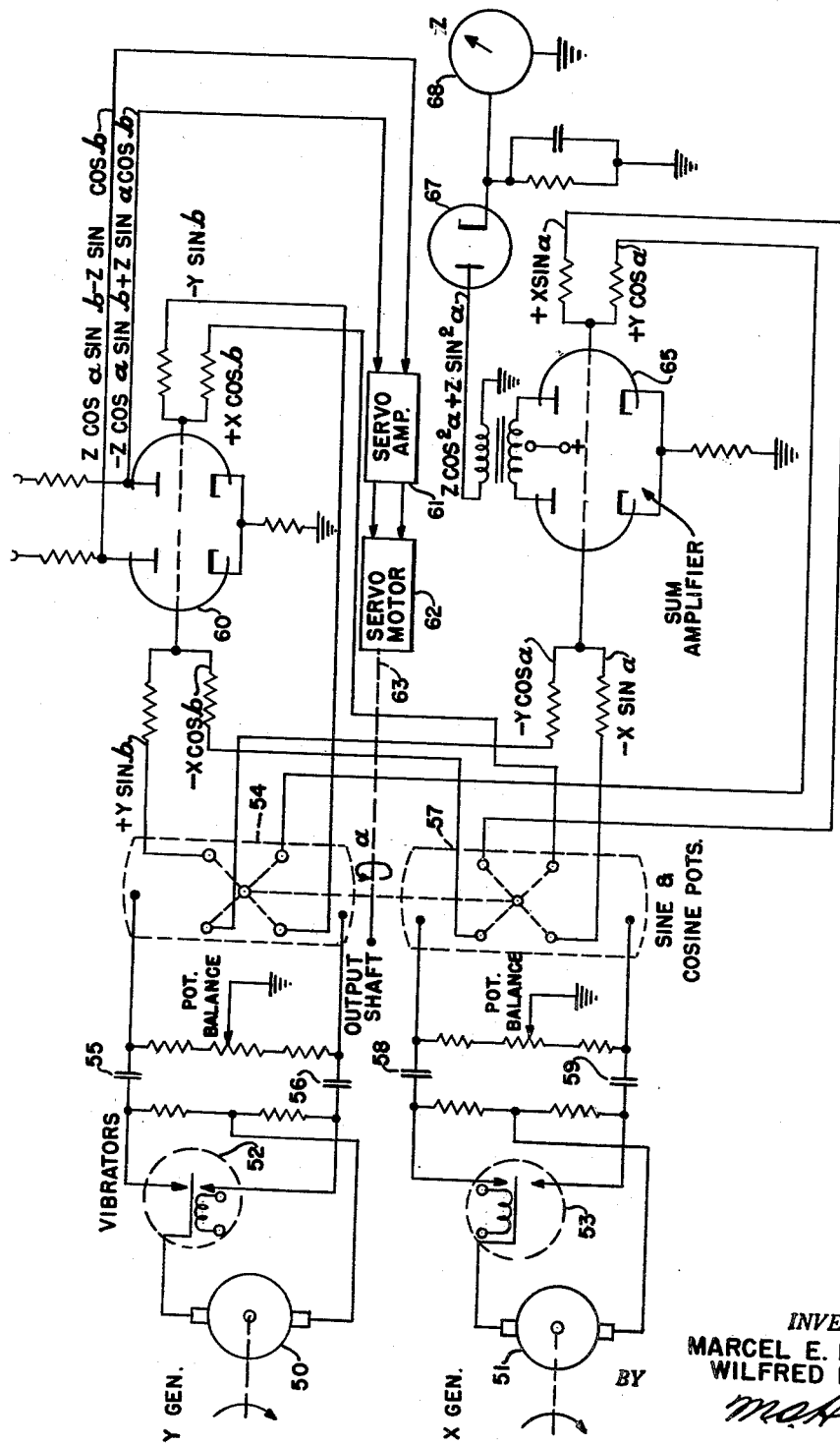

Patented Sept. 7, 1954

2,688,442

UNITED STATES PATENT OFFICE 2,688,442

VECTOR CALCULATOR

Marcel E. Droz, New York, N. Y., and Wilfred Roth, Cambridge, Mass., assignors, by mesne assignments, to the United States of America as represented by the Secretary of the Navy Application February 20, 1946, Serial No. 649,087

2 Claims. (Cl. 235—61)

This invention relates to computing devices, and more particularly to devices for the continuous summation of orthogonal vectors.

In many applications of computers it is necessary to continuously provide the instantaneous sum of two or more orthogonal vector quantities. The difficulty of performing this operation increases if the values of the vector quantities being summed may vary independently. One example of a problem involving the summation of two vectors is that of obtaining the speed and direction of an object when the north-south and east-west velocity components are given, and under the conditions that one or both of these components may vary at any time. More complex problems would require the summation of a greater number of vector quantities.

Accordingly, it is a principal object of this invention to provide an electromechanical computer for the summation of vector quantities.

It is also an object of this invention to provide an electromechanical computer which will continuously furnish the sum of a plurality of orthogonal vectors of variable magnitude.

The nature of the present invention and the above objects will appear more fully in the following detailed description of one embodiment thereof, taken with reference to the accompanying drawings in which:

Fig. 5 is a schematic diagram of the embodiment of Fig. 4.

Figure 1:
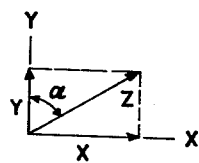
Fig. 1 is a vector diagram showing two vectors and their resultant.

The vector diagram of Fig. 1 illustrates the problem involved in the summation of two vectors. In Fig. 1 X and Y are two orthogonal vectors, the length of the heavy lines representing the respective magnitude of the vectors. Z is the vector sum of X and Y and $a$ is the angle between the directions of Y and Z. Under these conditions the component vectors X and Y can be expressed in terms of their resultant Z, and the angle $a$ by means of the relations:

$$X = Z \sin a$$
$$Y = Z \cos a$$

Figure 2:
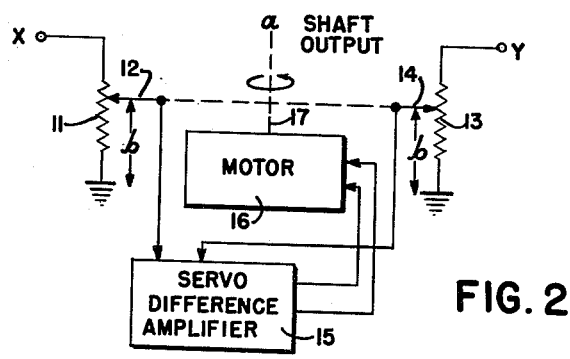
Fig. 2 is a block diagram illustrating the manner in which the invention is used to obtain the direction of the resultant of Fig. 1.

The manner of obtaining the direction angle $a$ is illustrated by the block diagram of Fig. 2.

A voltage proportional to X is fed to a potentiometer 11 in which the winding is so arranged that the output voltage appearing at sliding contact 12 is proportional to the cosine of the angle $b$ between the position of sliding contact 12 and a predetermined terminal of the potentiometer winding. The output voltage at sliding contact 12 is then proportional to $$X \cos b$$

or $$Z \sin a \cos b$$

Likewise a voltage proportional to the vector component Y is fed to potentiometer 13 which is similar to potentiometer 11 except that the output voltage varies according to the sine of the angle $b$. Therefore the output voltage at sliding contact 14 of potentiometer 13 will be proportional to $$Y \sin b$$

or $$Z \cos a \sin b$$

The two output voltages so obtained from potentiometers 11 and 13 are fed to a servo-difference amplifier 15. The output of amplifier 15, which is proportional to $$Z \sin a \cos b - Z \cos a \sin b$$

is used to operate motor 16 which drives shaft 17 and positions sliding contacts 12 and 14 of potentiometers 11 and 13. Through this arrangement motor 16 will move sliding contacts 12 and 14 until the output of amplifier 15 is equal to zero and this can occur only when the relation $$Z \sin a \cos b - Z \cos a \sin b = 0$$

holds. This can be true only if $$a = b$$

and therefore the system of Fig. 2 will adjust the angular position of shaft 17, and of sliding contacts 12 and 14, to the value of the desired angle $a$. Shaft 17 provides the output giving the direction angle of the resultant vector Z of the problem of Fig. 1.

Figure 3:
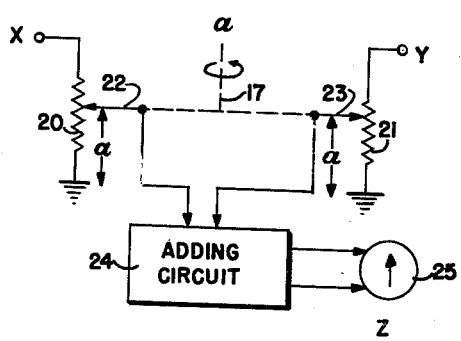
Fig. 3 is a block diagram illustrating the manner in which the invention is used to obtain the magnitude of the resultant of Fig. 1.

The manner of obtaining the magnitude of Z is illustrated by the block diagram of Fig. 3. A pair of potentiometers 20 and 21 of the same type as potentiometers 11 and 13 of Fig. 2 have their respective sliding contacts 22 and 23 driven by shaft 17 of Fig. 2. In this system the voltage proportional to X is fed to sinusoidal potentiometer 20 and the voltage proportional to Y is fed to cosinusoidal potentiometer 21. The output voltages at sliding contacts 22 and 23 will be equal to $$X \sin a \text{ and } Y \cos a$$

respectively, since the position of the sliding contacts will be adjusted to the angle $a$ by shaft 17. These two output voltages are fed to an adding circuit 24 which will have an output proportional to $$X \sin a + Y \cos a = Z \sin^2 a + Z \cos^2 a = Z$$

This output from adding circuit 24 is fed to indicator 25 which is calibrated to read in terms of the magnitude of Z. A system comprising the elements of Figs. 2 and 3 will perform the desired function of summing the two orthogonal vector components of Fig. 1. In the above descriptions and in the embodiments of Figs. 4 and 5 reference is made to the use of potentiometers for the resolution of the voltages representing the various vector components. Other types of resolvers, such as synchros, having outputs which are harmonic functions of the input voltages are equally applicable.

Figure 4:
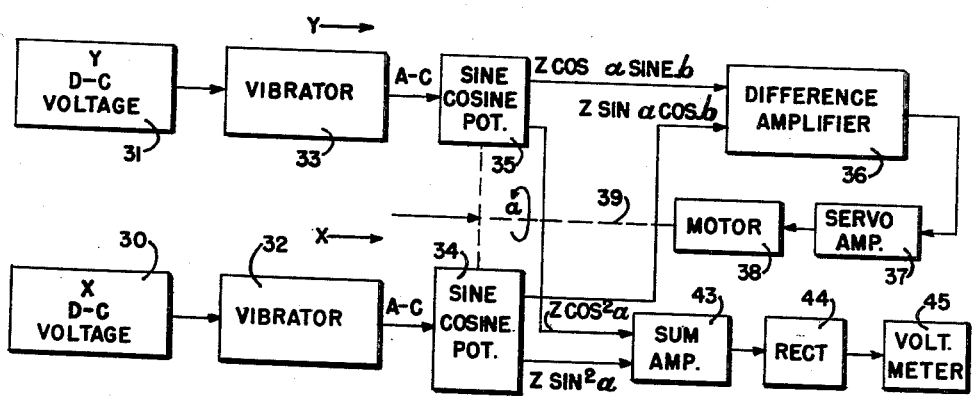
Fig. 4 is a block diagram of an embodiment of the invention employing the principles shown in Figs. 2 and 3.

An embodiment of the invention incorporating the elements of Figs. 2 and 3 is shown in Fig. 4. In this embodiment two D. C. generators 30 and 31 generate voltages proportional to the X and Y vector components, respectively. It will be apparent that these voltages may be supplied from potentiometers across constant voltage sources, or for A. C. computers may be established by means of variable transformers, such as the variac. The voltages established by generators 30 and 31 are fed to separate vibrators 32 and 33 which generate the X and Y A. C. voltages needed to operate the servo-drive system. The output of vibrator 32, proportional to X, is fed to a sine-cosine potentiometer 34, having two outputs, one proportional to $$X \cos b = Z \sin a \cos b$$

and the other proportional to $$X \sin b = Z \sin a \sin b$$

where $b$ is the position angle of the sliding contact of potentiometer 34. Likewise the output voltage of vibrator 33, proportional to Y, is fed to a similar sine-cosine potentiometer 35 having outputs $$Y \sin b = Z \cos a \sin b$$

and $$Y \cos b = Z \cos a \cos b$$

since the sliding contact of potentiometer 35 is mechanically coupled to that of potentiometer 34. The outputs $$Z \sin a \cos b \text{ and } Z \cos a \sin b$$

are fed to a difference amplifier 36, the output of which is in turn fed to servo-amplifier 37. The output of servo-amplifier 37 is used to operate motor 38 which drives shaft 39. Shaft 39 drives the sliding contacts of potentiometers 34 and 35 and also provides the direction angle output of the computer. As described with reference to Fig. 2 the position angle of sliding contacts of potentiometers 34 and 35 will be kept adjusted to the angle $a$ by the servo system comprising difference amplifier 36, servo-amplifier 37, and motor 38. The remaining outputs from potentiometers 34 and 35

$$Z \cos a \cos b = Z \cos^2 a$$

and $$Z \sin a \sin b = Z \sin^2 a$$

are fed to sum amplifier 43, which has an output proportional to $$Z \sin^2 a + Z \cos^2 a = Z$$

This output, Z, from sum amplifier 43 is rectified by rectifier 44 and used to operate a peak reading voltmeter 45. The scale of voltmeter 45 is calibrated in terms of Z. Therefore the magnitude and direction of the resultant vector Z are provided by voltmeter 45 and shaft 39, respectively.

A complete schematic diagram of the embodiment of Fig. 4 is shown in Fig. 5. The D. C. voltages proportional to the two vector components are generated by two tachometer generators 50 and 51. These D. C. voltages are changed to A. C. by means of vibrators 52 and 53 which have roughly square wave form outputs. Vibrator 52 is coupled to potentiometer 54 by means of isolating condensers 55 and 56, and vibrator 53 is likewise coupled to potentiometer 57 by condensers 58 and 59. Each of potentiometers 54 and 57 has a double pair of outputs to operate the following amplifiers in push-pull to reduce the effect of transients and improve system linearity. Double triode electron tube 60 performs the functions of a difference amplifier. The input to one grid of tube 60 is proportional to $$+Y \sin b - X \cos b$$

and the input to the other grid of tube 60 is proportional to $$-Y \sin b + X \cos b$$

where $b$ is the angle made by the shafts of potentiometers 54 and 57. The push-pull outputs of tube 60 are then proportional to $$Z \cos a \sin b - Z \sin a \cos b$$

and $$-Z \cos a \sin b + Z \sin a \cos b$$

since $$X = Z \sin a \text{ and } Y = Z \cos a$$

These outputs are fed to servo amplifier 61 the output of which drives servomotor 62. Servomotor 62 drives shaft 63 and moves the sliding contacts on potentiometers 54 and 57 until the inputs to servo amplifier 61 are each equal to zero. From the above relations it will be noted that this will be true if $a = b$. Hence, the angular position of shaft 63 is equal to the directional angle $a$ of the vector resultant Z.

Similarly, double-triode electron tube 65 constitutes a sum amplifier having push-pull inputs $$+X \sin a + Y \cos a$$

and $$-X \sin a - Y \cos a$$

respectively. This results in an output from tube 65 proportional to $$Z \sin^2 a + Z \cos^2 a = Z$$

which output is rectified by rectifier 67 and fed to peak reading voltmeter 68. The reading of voltmeter 68 will be proportional to the magnitude of the vector resultant Z, and voltmeter 68 may be calibrated to read directly in terms of any desired magnitude units.

The above detailed description of one embodiment of this invention is for purposes of illustrating the principles thereof. In applications requiring the summation of a greater number of vector quantities additional channels of the type described may be added to form a multi-channel computer. No effort has been made in this specification to exhaust the possibilities of other embodiments. The scope of the invention is defined by the appended claims.

What is claimed is:

1. An electromechanical computer for the continuous summation of a plurality of orthogonal vector quantities to yield the magnitude and direction of their resultant which comprises, means for establishing direct current voltages proportional to the magnitude of said vector quantities, means for converting said direct current voltages to corresponding alternating voltages, means for resolving said alternating voltages into values representing components of said vector quantities taken along and at right angles to a selected direction, a first push-pull amplifier, means for applying to said first amplifier voltages representing components taken at right angles to said selected direction in phase relationship to yield a difference voltage output, an alternating current servomechanism system responsive to said difference voltage to operate said resolving means to select a direction reducing said difference voltage to zero, the direction so selected representing the instantaneous angular direction of said resultant, a second amplifier connected in push-pull relationship, means for applying to said second amplifier voltages representing components taken along said selected direction in phase relationship to yield a sum voltage output representing the magnitude of said resultant, and indicating means responsive to the operation of said resolver and to said sum voltage to display the magnitude and angular direction of said resultant.

2. An electromechanical computer for the continuous summation of a plurality of orthogonal vector quantities comprising, a plurality of direct current generators for establishing voltages proportional to the magnitudes of said vector quantities, a plurality of potentiometers having windings varying according to trigonometric functions, said potentiometers being mechanically coupled to a common positioning shaft, means for converting said direct current voltages to corresponding alternating voltages for application to said potentiometers for the trigonometric resolution of said alternating voltages into components of the resultant of said vector quantities, a first amplifier connected in push-pull relationship, means for applying component voltages of said resultant to the input of said amplifier in a phase relationship to yield a difference alternating voltage output, an alternating current servomechanism system responsive to said difference voltage to position said shaft in a direction to reduce said difference voltage to zero, the angular position of said shaft representing the instantaneous angle of said resultant of said vector quantities, a second amplifier connected in push-pull relationship, means for applying component voltages of said resultant to the input of said second amplifier in a phase relationship to yield a summation alternating voltage output, and an indicator responsive to the peak value of said alternating output voltage to represent the instantaneous magnitude of said vector resultant.

References Cited in the file of this patent

UNITED STATES PATENTS

| Number | Name | Date |
| --- | --- | --- |
| 2,382,994 | Holden | Aug. 21, 1945 |
| 2,385,334 | Davey | Sept. 25, 1945 |
| 2,404,387 | Lovell | July 23, 1946 |